Sept. 15, 1942.  W. R. TUCKER  2,295,813
HYDRAULIC CONTROL CIRCUIT
Filed Feb. 3, 1940  2 Sheets-Sheet 1

INVENTOR
WARREN R. TUCKER
By Toulmin & Toulmin
ATTORNEYS

Sept. 15, 1942.  W. R. TUCKER  2,295,813
HYDRAULIC CONTROL CIRCUIT
Filed Feb. 3, 1940  2 Sheets-Sheet 2

INVENTOR
WARREN R. TUCKER
ATTORNEYS

Patented Sept. 15, 1942

2,295,813

UNITED STATES PATENT OFFICE 2,295,813

HYDRAULIC CONTROL CIRCUIT

Warren R. Tucker, Dayton, Ohio, assignor to The Hydraulic Development Corporation, Inc., Wilmington, Del., a corporation of Delaware Application February 3, 1940, Serial No. 317,102

9 Claims. (Cl. 121—41)

This invention relates to hydraulic control systems, and in particular to control systems for hydraulic radial pumps.

One object of this invention is to provide a pressure fluid delivery control for variable delivery pumps which will enable an operator standing at a place remote from the pump, to shift the pressure control of the pump from one pressure fluid delivery level to another such level.

It is another object of the invention to provide a pressure fluid delivery control for radial pumps having its delivery of fluid varied by movement of a flow-control member or shift ring, which comprises means for controlling said flow-control member or shift ring from a place remote from the pump so as selectively to move the pump from no-delivery or substantially no-delivery position to full-delivery position or vice versa, or to any position therebetween.

It is another object of the invention to provide a pressure fluid control for radial pumps in which the pump may be controlled from a place remote therefrom so as selectively to vary the pump stroke of the radial pumping pistons irrespective of whether the pump delivers its fluid in one direction or the other.

Still another object of the invention consists in providing a control for radial pumps in which the delivery of the pump is controllable by simple valve means remote from the pump.

A further object of the invention consists in providing a pressure fluid delivery control for a variable delivery pump having a flow-control member or shift ring for controlling the delivery of fluid thereof and a pilot pump supplying liquid for controlling the flow-control member or shift ring, in which the delivery volume of the variable delivery pump as set by the operator is maintained irrespective of changes in the fluid pressure of the pilot pump.

These and other objects and advantages of the invention will appear more clearly from the following description in connection with the accompanying drawings in which.

Figure 1:
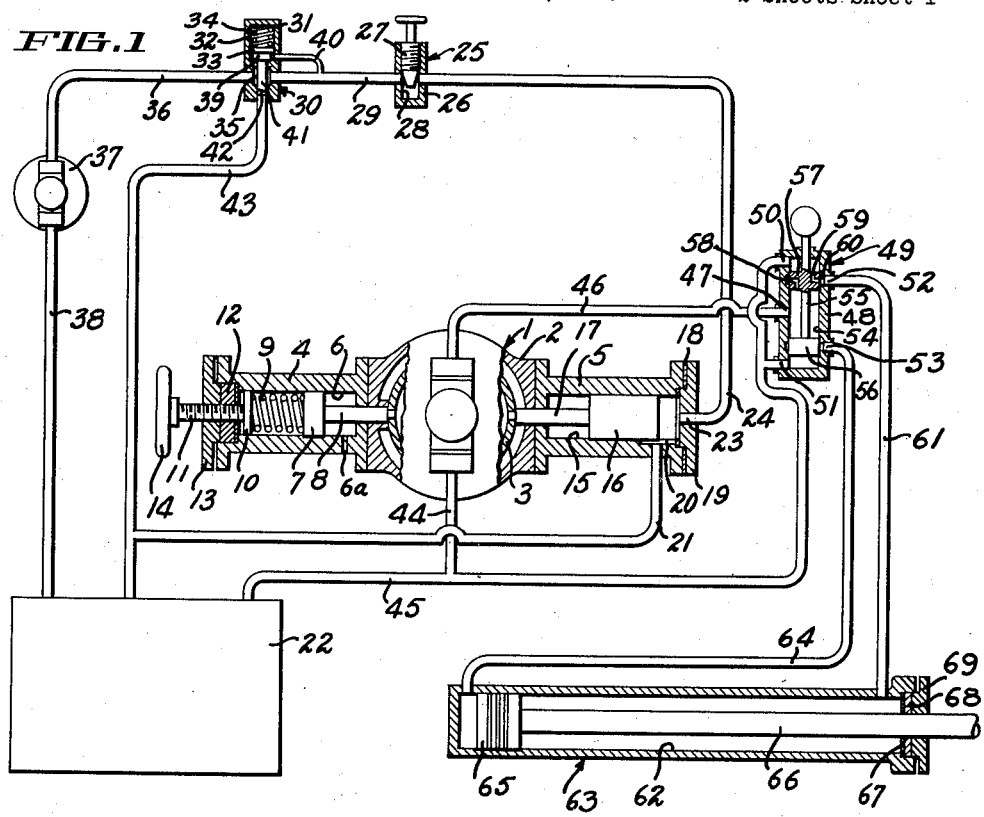
Figure 1 illustrates an embodiment of a pressure fluid delivery control according to the present invention in connection with a hydraulic motor.

Referring now to Figure 1 of the drawings in detail, the variable delivery pump, generally designated 1, comprises a casing 2 and a flow-control member or shift ring 3. The shift ring surrounds a secondary rotor and a primary rotor carrying a plurality of radial pistons, the stroke of which is variable by movement of the flow-control member or shift ring 3. The general construction and arrangement of the primary rotor and secondary rotor and the radial pistons is well-known in the art, and for a more detailed description thereof reference may be had to U. S. Patents Nos. 1,964,244 and 2,041,172.

Attached to each side of the pump casing 2 is a hollow arm 4 and 5 respectively. The hollow arm 4 comprises a cylinder bore 6 having reciprocably mounted therein a piston 7. Connected with the piston 7 is a push rod 8 screwed into or otherwise connected with the control member or shift ring 3 and urged by a spring 9 so as to move the shift ring 3 toward the right, i. e., to move the pump to full stroke delivery position. While one end of the spring 9 bears against the piston 7, the other end of the spring bears against a washer 10 slidably mounted in the cylinder bore 6. The washer 10 is engaged by an adjusting screw 11 adjustably threaded in a closing member 12 closing the outer end of the cylinder bore 6. The closing member 12 is held in its place by a head 13 having a passage for the adjusting screw 11 and being attached to the arm 4. The adjustment of the adjusting screw 11 may be effected by a handwheel 14 keyed to the adjusting screw 11. To prevent leakage from the bore 6 toward the outside, a gasket is preferably arranged between the closing member 12 and a wall portion of the hollow arm 4. The cylinder bore 6 communicates with the outside by means of a breather opening 6a to prevent a suction effect in that portion of bore 6 which is located between the piston 7 and the casing 2 of the pump.

The hollow arm 5 comprises a cylinder bore 15 having slidably mounted therein a piston 16. Connected with the piston 16 is a push rod 17 preferably threaded into the shift ring 3 and adapted to move the same toward the left when the necessary pressure acts upon the outer piston surface of the piston 16. The outer end of the cylinder bore 15 is closed by means of a gasket 18 and a head 19 connected to the arm 5. Adjacent the outer end of the cylinder bore 15 is provided a slit 20 which communicates through a conduit 21 and conduit 43 with a fluid tank 22. The head 19 is provided with an aperture 23 communicating through a conduit 24 with a choke valve generally designated 25. The choke valve 25 comprises a cylinder 26 and a choke member 27 adjustably mounted, for instance by means of a thread, in the cylinder 26. The cylinder bore 28 of the choke valve cylinder 26 is adapted to communicate through a conduit 29 with a relief valve 30. The relief valve 30 comprises a casing 31 having a cylinder bore 32 and a piston 33 reciprocably mounted in said bore. A spring 34 is mounted in the cylinder bore 32 and bears with one end against the upper wall of the valve casing 31 while the other end of the spring bears against the piston 33. The relief valve 30 comprises a second chamber 35 which communicates with the conduit 29 while a further conduit 36 leads from the chamber 35 to a pilot pump 37. A conduit 38 leads from the pilot pump 37 to the fluid tank 22.

The piston 33 of the relief valve 30 is provided with a hub 39 which prevents the piston 33 from abutting the lower end of the cylinder bore 32 and enables fluid to pass from the conduit 29 through a conduit 40 below the piston 33. A piston rod 41 connected to the piston 33 is adapted to close a port 42 in the chamber 35. The port 42 communicates through a conduit 43 with the fluid tank 22.

The suction side of the variable delivery pump 1 is connected with the fluid tank 22 by means of a conduit 44 and a conduit 45 while the pressure side of the pump 1 communicates through a conduit 46 with a port 47 in the casing 48 of the four-way valve 49. The casing 48 comprises four further ports 50, 51, 52 and 53, each being adapted to communicate with the cylinder bore 54 in the casing 48. Movably mounted in the cylinder bore 54 is a valve member 55 having two spaced pistons 56 and 57. The piston 57 has a bore 58 leading from the peripheral surface of the piston 57 to the lower side thereof, while a bore 59 leads from the upper side of the piston 57 to its peripheral surface. An annular groove 60 in the casing 48 communicates with the port 52 which in its turn communicates with a conduit 61 leading to one end of a cylinder bore 62 of a fluid motor 63. A conduit 64 leads from the other end of the cylinder bore 61 to the port 53 in the valve casing 48. The ports 50 and 51 in the valve casing 48 communicate with the conduit 45. The fluid motor 63 comprises a piston 65 reciprocably mounted in the cylinder bore 62 and having a piston rod 66 connected therewith, which piston rod passes through a gasket 67, closure member 68 and cylinder head 69 toward the outside for driving any desired mechanism.

The four-way valve 49 is preferably so located with respect to the choke valve 25 that the operator can operate the said two valves from the same place.

The operation of the device as illustrated in Figure 1 is as follows:

Assume that it is desired to move the motor piston 65 slowly toward the right. To this end, the operator adjusts the choke member 27 so that the flow from the conduit 29 to the conduit 24 is restricted. The pilot pump 37 then supplies fluid through the conduits 36 and 29, through the cylinder bore 28 of the choke valve 25 and the conduit 24 into the cylinder bore 15 of the hollow arm 5. Since only a small quantity of the fluid in the cylinder bore 15 may escape through the slot 20, and the conduits 21 and 43 into the fluid tank 22, fluid pressure in the cylinder bore 15 builds up and moves the piston 16 toward the left so that a larger portion of the slot 20 is released by the piston 16, thereby enabling a greater quantity of liquid to flow from the conduit 24 through the conduits 21 and 43 into the fluid tank 22. The movement of the piston 16 continues until equilibrium is established between the thrust of the spring 9 and the fluid pressure in the cylinder bore 15 past the piston 16. If for any reason the pressure in the conduit 29 should exceed a predetermined value, pressure fluid from conduit 29 will pass through conduit 40 below the piston 33 and lift the latter against the thrust of the spring 34, thereby by-passing some liquid from the conduit 36 through the conduit 43 into the fluid tank 22.

Due to the movement of the piston 16 toward the left, the push rod 17 has shifted the shift ring 3 likewise toward the left thereby restricting the stroke of the pump pistons. Consequently, if the valve member 55 is moved downward to its lowermost position, pressure fluid flows from the pump 1 through the conduit 46 into the bore 54 of the valve casing 48. From the bore 54 the pressure fluid flows through the conduit 64 into the cylinder bore 62 in front of the piston 65 and moves the latter slowly toward the right. During the movement of the piston 65 toward the right, the fluid between the piston 65 and the gasket 67 may escape through the conduit 61, the upper portion of cylinder bore 54, and the conduits 45 and 44 to the suction side of the pump 1. Since the area of the piston 65 which is adjacent the piston rod 66 is smaller than the opposite piston area, so that less fluid than needed by the pump 1 flows through conduit 61 into the conduit 44, additional fluid is drawn into the pump from the tank 22.

If now the choke member 27 is moved somewhat toward the outside of the choke valve cylinder 26, more fluid passes from the conduit 29 through the conduit 24 into the cylinder bore 15, thereby increasing the fluid pressure acting upon the piston 16 so that the piston 16 moves together with the shift ring 3 further toward the left until again equilibrium has been established between the thrust of the spring 9 and the fluid pressure in the cylinder bore 15. In this way the stroke of the pump 1 is further restricted thereby decreasing the speed of the piston 65 of the hydraulic motor 63.

If during the movement of the piston 65, it is desired to increase the speed thereof, the choke member 27 is moved toward the inside thereby decreasing the flow of fluid through the choke valve 25 and decreasing the fluid pressure in the bore 15 which acts upon the piston 16 so that the spring 9 may move the shift ring 3 toward the right thereby increasing the delivery stroke of the pump.

Suppose that the piston 65 is now to be moved back to its left-hand position. To this end, the valve member 55 is shifted to its uppermost position, whereupon pressure fluid will flow from the pump 1 through the conduit 46, the bore 54 and the conduit 61 into the cylinder bore 62 between the piston 65 and the gasket 67. Consequently, the piston 65 will move toward the left with a speed determined, as previously described, by the setting of the choke member 27. In this instance the fluid in front of the piston 65 may escape through the conduit 64, the lower portion of the valve bore 54, the port 51 and the conduits 45 and 44 to the suction side of the pump 1.

In case it is desired to effect the leftward stroke of the piston 65 very quickly, the choke member 27 is so adjusted as to fully shut off communication between the conduits 29 and 24. The fluid to the right of the piston 16 in the arm 5 will then escape through the slot 20 and the conduits 21 and 43 into the tank 22 while the spring 9 moves the shift ring 3 through the intervention of piston 7 and push rod 8 toward the right, thereby putting the pump 1 on full stroke or maximum delivery.

If it is desired to stop the piston 65, this may be effected by setting the choke member 27 so that the fluid acting upon the piston 16 shifts the flow-control member into no-delivery position. In addition thereto the valve member 55 may be shifted into the position shown in Figure 1, in which the fluid which may still flow through the conduit 46 flows through the bore 59, the annular groove 60, and the bore 58 into the conduit 45, and from there either to the suction side of the pump 1, if the latter has not yet reached the no-delivery position, or to the tank 22.

Figure 2:
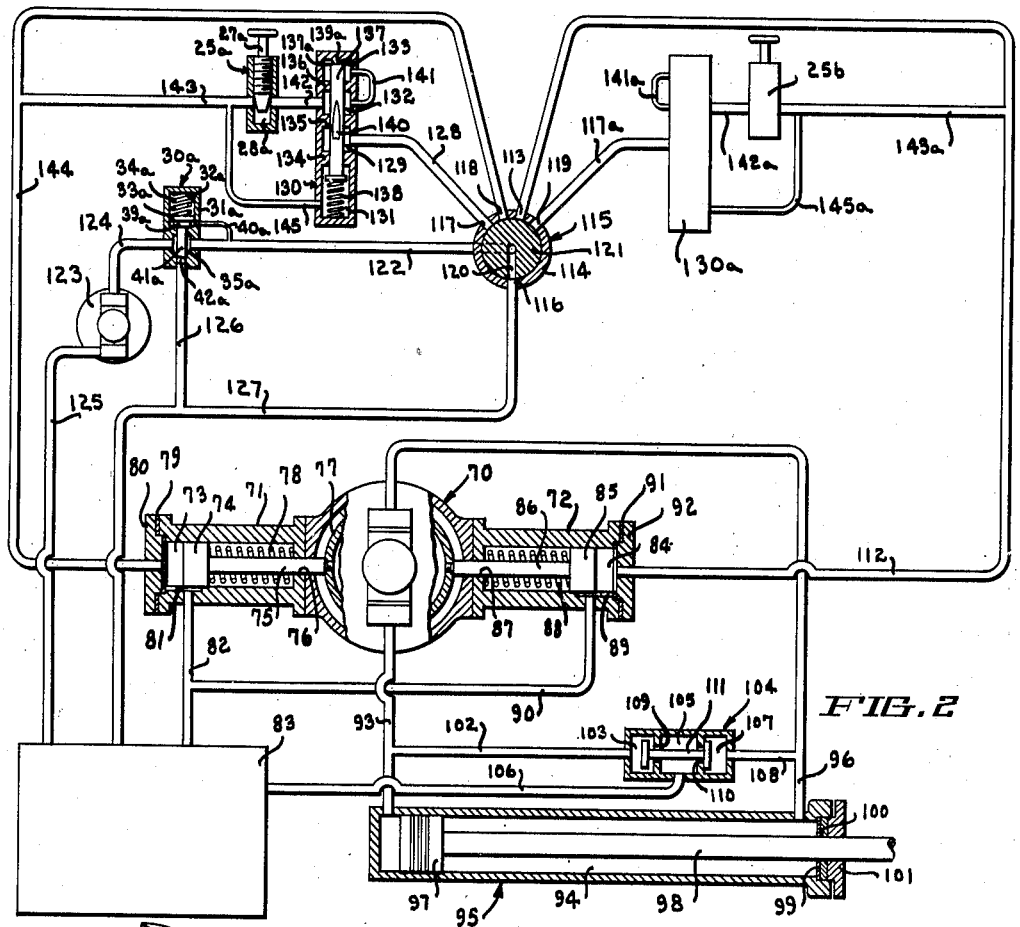
Figure 2 is a second embodiment of the invention likewise in connection with a hydraulic motor.
Figure 3:
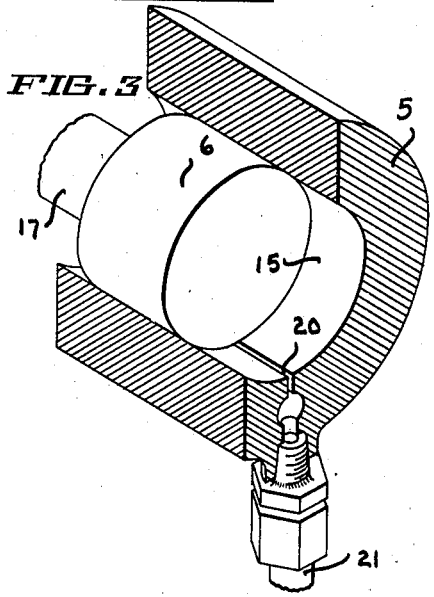
Figure 3 shows a detail of the controlling means according to the present invention.

Referring now to the embodiment of Figure 2, the pump 70 is similarly constructed as the pump 1 of the embodiment shown in Figure 1 and has likewise on each side thereof a hollow arm 71 and 72. The hollow arm 71 comprises a cylinder bore 73 having a piston 74 reciprocably mounted therein. The piston 74 is connected with a push rod 75 passing through an opening 76 in the hollow arm 71 and adapted to engage the shift ring 77 of the pump. A spring 78 is arranged between the inner end of the cylinder bore 73 and the piston 74 and constantly urges the piston 74 toward the left. The outer end of the cylinder bore 73 is closed by a gasket 79 and the cylinder head 80. Adjacent the outer end of the cylinder bore 73 is a slot 81 which is similar to the slot 20 of Figures 1 and 3 and communicates through a conduit 82 with the fluid tank 83.

The hollow arm 72 comprises a cylinder bore 84 having reciprocably mounted therein a piston 85 connected with a push rod 86 which passes through an opening 87 of the hollow arm 72 and is adapted to engage and move the shift ring 77. A spring 88 having the same thrust as spring 78 is arranged between the inner end of the cylinder bore 84 and the piston 85 so that the springs 78 and 88 tend to move the shift ring 77 into its intermediate position thereby shifting the pump to neutral position. Adjacent the outer end of the cylinder bore 84 is a slot 89, similar to slot 81, which communicates through a conduit 90 with the conduit 82. The outer end of the hollow arm 72 is closed by a gasket 91 and cylinder head 92. Similar to the embodiment of Figure 1, a conduit 93 leads from one port of the pump 70 to one end of the cylinder bore 94 of the fluid motor 95 while a conduit 96 leads from the other end of the cylinder bore 94 to the other port of the pump 70. A piston 97 of the fluid motor is connected with a piston rod 98 passing through a gasket 99, closure member 100 and head 101 toward the outside for driving a desired device. The conduit 93 communicates through a conduit 102 with a chamber 103 of a shuttle valve 104. The shuttle valve 104 comprises a chamber 105 which communicates through a conduit 106 with the fluid tank 83. A third chamber 107 of the shuttle valve 104 communicates through a conduit 108 with the conduit 96. The chambers 103 and 105 are adapted to communicate with each other through an opening 109 while the chamber 107 is adapted to communicate with the chamber 105 through an opening 110. The two openings 109 and 110 are alternately opened and closed by a double valve member 111.

The cylinder bore 84 of the hollow arm 72 communicates through a conduit 112 with a port 113 in a valve casing 114 of a control valve 115. The valve casing 114 comprises four further ports 116, 117, 118 and 119 which may selectively be brought into communication with a bore 120 in the valve cock 121. The bore 120 of the valve cock 121 communicates through a conduit 122 with a relief valve 30a which in its details corresponds to the relief valve 30 of Figure 1 so that a further description thereof is not necessary. The various parts of the relief valve 30 bear the same numerals as those of the valve 30, however with the additional letter a. Similar to the embodiment of Figure 1, the relief valve 30a likewise communicates with a pilot pump 123 through a conduit 124, and a conduit 125 leads from the pilot pump 123 to the valve tank 83. The chamber 35a of the relief valve 30a communicates through a conduit 126 with a conduit 127 which leads to the fluid tank 83. The other end of the conduit 127 communicates with the port 116 of the control valve 115. The port 117 of the control valve 115 communicates through a conduit 128 with a chamber 129 of a pressure-responsive automatic choke valve 130. The automatic choke valve 130 comprises three further chambers 131, 132 and 133 respectively. The four chambers 129, 131, 132 and 133 are separated from each other by partitions 134, 135 and 136, each being provided with an aperture through which a reciprocable shaft 137 passes, which may be hollow but is closed at its ends.

The hollow shaft 137 which is urged by a spring 138 toward the upper end of the casing 139 of the automatic choke valve is provided with two apertures 140. The two apertures 140 (only one is shown in the drawings) are in alignment with each other so that when the hollow shaft 137 occupies its intermediate or normal position, liquid from the chamber 129 may pass through the apertures 140 into the chamber 132. A conduit 141 continuously connects the chamber 132 with the chamber 133. The chamber 132 communicates with a conduit 142 which leads to a chamber 28a of a choke valve 25a. This choke valve 25a is similar to the manually adjustable choke valve 25 shown in Figure 1 and likewise comprises a choke member 27a. In alignment with the conduit 142 is a conduit 143 which leads from the chamber 28a to a conduit 144. The conduit 144 leads to the bore 73 in the hollow arm 71 connected with the casing of the pump 70. The other end of the conduit 144 communicates with the port 118 of the control valve 115.

A conduit 145 effects communication between the chamber 131 of the automatic choke valve 130 and the conduit 143. Similarly to the port 117, the port 119 communicates through a conduit 117a with an automatic choke valve 130a which is of the same construction as the automatic choke valve 130 and which communicates through a conduit 145a with a conduit 143a leading into the conduit 112. Between the automatic choke valve 130a and the conduit 143a is a manually adjustable choke valve 25b which is of the same construction as the choke valve 25a. The manually operable choke valve 25a communicates with the automatic choke valve 130a through a conduit 142. The automatic choke valve 130a is provided with a by-pass conduit 141a similar to the by-pass conduit 141 of the choke valve 130.

The operation of the embodiment shown in Figure 2 is as follows:

Assume that all parts occupy the position shown in Figure 2 in which the pump 70 is in no-delivery or neutral position, and that a slow movement of the motor piston 97 toward the right is now desired. To this end, the operator shifts the cock 121 so that the bore 120 registers with the port 117. Fluid pressure from the pilot pump 123 then passes through the conduit 124, the chamber 35a of the relief valve 30a, the conduit 122 into the bore 120. From the bore 120 liquid flows through the conduit 128 into the chamber 129 and from there through the openings 140 into the chamber 132. The liquid then passes through the conduit 142 into the chamber 28a of the choke valve 25a. Due to the fact that the choke valve member 27a restricts the flow into and from the chamber 28a, only a limited quantity of liquid passes through the conduits 143 and 144 into the cylinder bore 73 where it acts upon the piston 74 and moves the latter toward the right against the thrust of the spring 78.

Since only a small quantity of fluid may escape from the bore 73 through the slot 81 and conduit 82 into the fluid tank 83, pressure builds up in the bore 73 and moves the piston 74 together with the push rod 75 and shift ring 77 toward the right, while a larger portion of the slot 81 is released. During this movement of the shift ring 77, the fluid between the piston 85 and the head 92 may escape through the conduit 90 into the fluid tank 83. The movement of the piston 74 continues until equilibrium is established between the thrust of the spring 78 and the fluid pressure acting upon the piston 74. The pump has then been moved from neutral position to a position in which a restricted quantity of liquid is supplied by the pump 70 through the conduit 93 past the motor piston 97. The liquid acting upon the piston 97 slowly moves the latter toward the right.

During this movement, the fluid between the piston 97 and the head 101 may escape through the conduit 96 from where it flows to the suction side of the pump 70. Since, however, the area of piston 97 is less adjacent the piston rod 98 than it is adjacent the conduit 93 so that less fluid escapes from the cylinder bore 94 into the conduit 96 than is needed by the pump 70, and since the pressure in conduit 93 has moved the valve member 111 toward the right, additional fluid is drawn into the conduit 96 from the tank 83 through the conduit 106, the chamber 105, opening 110, chamber 107 and conduit 108.

If now for some reason the pressure in the pilot pump 123 should decrease so that also the pressure in the conduit 128 and the chamber 129 decreases, the pressure in the chambers 132 and 133 and in the conduit 142 will also decrease. Consequently, the pressure in the chamber 131 together with the thrust of the spring shifts the hollow plunger 137 upward thereby increasing the amount of liquid passed from the chamber 129 to the chamber 132 so that the pressure in the chambers 132 and 133 and in the conduit 142 increases and the previous pressure drop between the conduits 142 and 143 is restored; or in other words, the pressure in the conduits 143 and 144 is maintained. In this way the same desired pressure will always act upon the piston 74, irrespective of variations in the pressure of the pilot pump 123.

If on the other hand, the pressure in the pilot pump 123 should, for any reason, increase, the pressure in the conduit 128 and the chambers 129, 132 and 133 will likewise increase. This causes the fluid in the chamber 133 to act upon the plunger 137 so as to move the latter downwardly thereby restricting the flow of fluid between the chambers 129 and 132 so that the previous pressure in the conduit 142 and thereby also the pressure drop between the conduits 142 and 143 is restored and the same pressure in the chamber 73, which previously acted upon the piston 74, is maintained. In order to enable the liquid in the chamber 133 in all circumstances to act upon the plunger 137, an abutment 139a is provided which has an area less than the adjacent piston surface 137a.

When a quick movement of the piston 97 toward the right is desired, the cock 121 is shifted so that the bore 120 registers with the port 118 of the control valve 115. In this way the two choke valves 130 and 25a are short circuited and the fluid from the cylinder valve passes directly through the conduit 144 into the bore 73 past the piston 74 and moves the latter toward its extreme right-hand position thereby shifting the shift ring 77 and the pump 70 to full stroke delivery. A maximum quantity of liquid is then supplied from the pump 70 through the conduit 93 to the piston 97.

If, for some reason, the pressure in the cylinder bore 73 should exceed a predetermined amount, the pressure built up in the conduit 122 acts through the conduit 40a below the piston 33a and lifts the same together with the piston rod 41a so as to release fluid from the chamber 35a to the fluid tank 83.

The movement of the motor piston 97 from its right-hand position to its left-hand position is similar to that from its left-hand position to its right-hand position. It is merely necessary to shift the cock 121 so that, if a slow movement of the motor piston 97 toward the left is desired, the bore 120 registers with the port 119. Inasmuch as the valves 130a and 25b are of the same construction as the valves 106 and 25a, and since the pipe connections of the valves 130a and 25a with the cylinder bore 84 are similar to those of the valves 130 and 25a with the cylinder bore 73, the operation of the left-hand movement of the piston 97 is identical with the operation of the right-hand movement of the piston 97. The only difference consists merely in that in this instance the valve member 111 is shifted toward the left due to the pressure in the conduits 96 and 108, so that the surplus fluid which escapes from the bore 94 through the conduit 93 and is not needed by the pump 70 may escape into the fluid tank 83 through the conduits 102 and 106.

Figure 4:
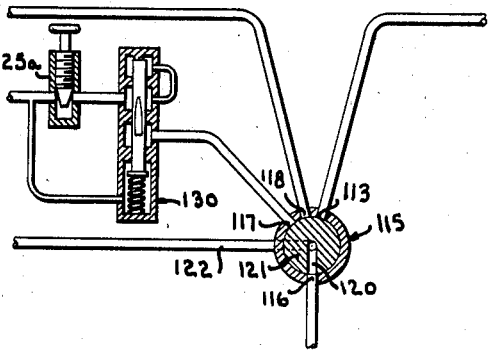
Figure 4 is a variation of a portion of the hydraulic system.

If it is desired to regulate the movement of the motor piston 97 in one direction only whereas in the other direction fast movement of the motor piston is always desired, the valves 130a and 25b together with the conduits 117a and 143a may be eliminated so that a pipe connection is obtained as illustrated in Figure 4.

Figure 5:
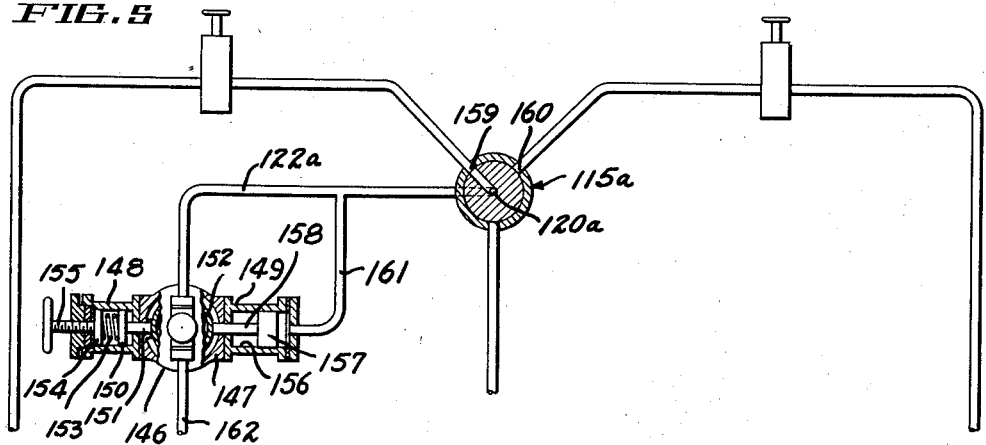
Figure 5 is a further modification of the hydraulic system.

A further simplification of the control mechanism according to the present invention may be obtained by replacing the pilot pump 37 and the relief valve 30 of Figure 1, or the pilot pump 123 and relief valve 30a of Figure 2 by a pump 146 illustrated in Figure 5. This pump is substantially similar to the pump 1 in Figure 1 with the exception that it is of materially smaller dimensions. The pump 146 comprises the casing 147 having attached thereto on each side a cylinder 148 and 149 respectively. The cylinder 148 has a piston 150 connected through a push rod 151 with a shift ring 152. A spring 153 engages on one side the piston 150 and on the other side a washer 154 which may be adjusted by the adjusting screw 155. The cylinder 149 has a cylinder bore 156 having reciprocably mounted therein a piston 157. The piston 157 is connected by a push rod 158 with the shift ring 152. One side of the pump is connected through a conduit 122a with a bore 120a of the control valve 115a. This control valve, which in Figure 5 is shown with two ports 159 and 160 may, of course if desired, be replaced by the control valve 115 shown in Figure 2 or the control valve 115b shown in Figure 4. The cylinder bore 156 of the pump 146 communicates through a conduit 161 with the conduit 122a. A conduit 162 leads from the other side of the pump to a fluid tank (not shown in the drawings) corresponding to the fluid tank 22 or 83 respectively of Figures 1 and 2.

As will be clear from the foregoing description, an increase in pressure in the conduit 122a will act through the conduit 161 upon the piston 157, thereby shifting the shift ring 152 toward the left and restricting the quantity of fluid delivered by the pump 146 which now takes the place of the pilot pump 37 or 123. On the other hand, if a decrease in pressure occurs in the conduit 122a, the pressure acting upon the piston 157 likewise decreases and the shift ring 152 is moved toward the right by the spring 153, thereby increasing the quantity of liquid delivered into the conduit 122a.

It will be understood that I desire to comprehend within my invention such modifications as come within the scope of the claims.

Having thus fully described my invention, what I claim as new and desire to secure by Letters Patent is:

1. A hydraulic control circuit comprising in combination a reciprocable member, yielding means urging said reciprocable member to move in one direction, a cylinder comprising a slot adjacent one end thereof, said slot communicating with an exhaust, a fluid operable plunger movable in said cylinder for moving said reciprocable member in another direction, a fluid source for supplying pressure fluid to said cylinder for actuating said plunger, said plunger being adapted at least partially to uncover said slot in said cylinder for discharging a portion of the fluid acting upon said plunger, and control means interposed between said fluid source and said cylinder for conveying a variable but predetermined pressure to said cylinder to move said plunger into and in cooperation with said yielding means to maintain said plunger in a predetermined position for a desired time irrespective of variations in pressure between said fluid source and said control means.

2. A hydraulic control circuit comprising in combination a reciprocable member, two cylinders each having a longitudinal slot, connected with a fluid storage tank, and a fluid operable plunger adapted selectively to cover or release at least a portion of said slot and to move said flow-control member from a point intermediate its extreme positions to any desired position between said point and one of said extreme positions, a pressure fluid source adapted selectively to be connected with one or the other of said two cylinders to supply fluid thereto, control means having a fluid inlet and outlet and being interposed between said fluid source and at least one of said cylinders for varying the flow of fluid from said fluid source to at least one of said cylinders, and means automatically maintaining a desired pressure at the inlet of said control means irrespective of variations in pressure in said fluid source.

3. A hydraulic control circuit comprising a reciprocable member, two cylinders independent of each other and respectively arranged at opposite sides of said member, each cylinder having a longitudinal slot communicating with a fluid tank and a fluid operable plunger adapted selectively to cover or release said slot at least in part and to move said reciprocable member from one extreme position to another extreme position or a desired point therebetween, a fluid source adapted selectively to supply fluid to one or the other of said two cylinders, controlling means for varying the flow of fluid from said source to one of said cylinders, said control means having a fluid inlet adapted to be connected with said fluid source and a fluid outlet adapted to be connected with said last mentioned one of said cylinders, means automatically maintaining a desired pressure at said inlet of said controlling means, and means operable so as to short-circuit said pressure maintaining means and said controlling means for allowing a quick shifting movement of said flow-control member to an extreme position.

4. A hydraulic control circuit comprising in combination, a reciprocable member, two cylinders associated with said reciprocable member and each having a slot therein communicating with an exhaust, a fluid source for supplying pressure fluid to said cylinders, two fluid operable plungers respectively mounted in said cylinders and adapted to vary the flow of fluid from the respective cylinder to said exhaust, said plungers being also adapted selectively to move said reciprocable member in one or the other direction to a desired variable position, controlling means interposed between said fluid source and said cylinders for varying the flow of fluid to the latter, and means operable selectively to short-circuit said controlling means for causing a quick movement of said reciprocable member in one or the other direction without affecting the position of said controlling means.

5. In a hydraulic circuit, a reciprocable member, yielding means continuously urging said member into a predetermined position, two cylinders each having a variable longitudinal opening therein connected with an exhaust, and a fluid operable plunger controlling said opening and adapted to move said reciprocable member to a desired position against the thrust of said yielding means, a fluid source adapted selectively to supply pressure fluid to one or the other of said two cylinders, controlling means interposed between said fluid source and at least one of said cylinders to vary the pressure conveyed thereto, and means adapted selectively to short-circuit said controlling means.

6. In a hydraulic circuit, a reciprocable member, spring means tending to hold said reciprocable member in zero or neutral position, two fluid operable plungers adapted to move said reciprocable member from said neutral position to a desired position in different directions, each of said plungers being adapted selectively to cover or uncover at least a portion of an exhaust opening through which fluid acting on said plungers may escape, a fluid source connected with a control valve adapted selectively to effect communication between said fluid source and one or the other of said plungers to convey fluid pressure thereto, and choke means interposed between said control valve and at least one of said plungers for varying the flow of fluid to said plungers, said control valve being operable so as to short-circuit said choke means.

7. In a hydraulic circuit, a reciprocable member, yielding means tending to hold said member in a predetermined position, hydraulic motor means adapted to shift said reciprocable member in opposite directions and comprising a variable exhaust opening controlled by said motor means, a fluid source adapted to supply pressure fluid to said hydraulic motor means for actuating said reciprocable member, control means between said fluid source and said motor means for varying the fluid pressure acting on the latter, means for automatically regulating the fluid pressure at the inlet to said controlling means to produce a predetermined constant pressure in said motor means while positively maintaining said reciprocable member in its respective position, and manually operable means adapted selectively to short-circuit said control means and pressure maintaining means.

8. In a hydraulic control circuit, a reciprocable member, yieldable means tending to maintain said member in a predetermined position, servomotor means comprising a cylinder having a discharge opening therein, a hydraulically operable plunger movable in said cylinder and directly controlling said opening so as to increase the effective area of said opening when moving in one direction, and to decrease the said area when moving in the opposite direction, a fluid source for supplying pressure fluid to said cylinder for actuating said plunger against the thrust of said yielding means, and choke means interposed between said fluid source and said cylinder for varying the pressure acting on said plunger to move said plunger into and positively maintain the same in any desired position between its end positions for any desired time.

9. In a hydraulic system, a reciprocable member, yielding means urging said member in one direction, a cylinder having a hydraulically operable plunger therein for moving said member in the opposite direction, said cylinder having a longitudinal opening therein adapted selectively to be covered or uncovered at least in part by said plunger responsive to the fluid pressure acting on said plunger and also adapted to be connected with an exhaust, and means for admitting a predetermined but variable fluid pressure to said cylinder and maintaining said pressure for any desired time.

WARREN R. TUCKER.